United States Patent
Juretko et al.

(10) Patent No.: US 9,729,021 B2
(45) Date of Patent: Aug. 8, 2017

(54) COIL FORMER HAVING INTEGRATED RETAINERS FOR A PHASE ISOLATION PAPER

(71) Applicant: Robert Bosch GmbH, Stuttgart (DE)

(72) Inventors: Martin Juretko, Hildesheim (DE); Thomas Fischer, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 208 days.

(21) Appl. No.: 14/412,999

(22) PCT Filed: Jun. 27, 2013

(86) PCT No.: PCT/EP2013/063465
§ 371 (c)(1),
(2) Date: Jan. 5, 2015

(87) PCT Pub. No.: WO2014/005911
PCT Pub. Date: Jan. 9, 2014

(65) Prior Publication Data
US 2015/0171692 A1    Jun. 18, 2015

(30) Foreign Application Priority Data
Jul. 3, 2012 (DE) .......... 10 2012 211 468

(51) Int. Cl.
*H02K 3/48* (2006.01)
*H02K 3/34* (2006.01)
(Continued)

(52) U.S. Cl.
CPC ............ *H02K 3/345* (2013.01); *H02K 3/325* (2013.01); *H02K 3/34* (2013.01); *H02K 3/522* (2013.01); *H02K 2203/12* (2013.01)

(58) Field of Classification Search
CPC ............... H02K 3/345; H02K 3/325
(Continued)

(56) References Cited

U.S. PATENT DOCUMENTS 7,253,547 B2 * 8/2007 Shin .................. H02K 1/148
                                                    310/179
2002/0149281 A1   10/2002 Saint-Michel et al.
(Continued)

FOREIGN PATENT DOCUMENTS

CN          1677792 A       10/2005
DE        102005050987       5/2007
(Continued)

OTHER PUBLICATIONS

International Search Report for Application No. PCT/EP2013/063465 dated Aug. 5, 2014 (5 pages).

*Primary Examiner* — Hanh Nguyen
(74) *Attorney, Agent, or Firm* — Michael Best & Friedrich LLP

(57) ABSTRACT

The invention relates to a coil former (110) for a coil (100) of an electric machine (400). The coil former has a coil core (112) and a terminating wall (115) having a first edge (118) and a second edge (119). The first edge is arranged opposite the second edge, and the terminating wall is designed to retain a coil wire (120), which can be wound around the coil core, in a wound position. The terminating wall has a first retaining projection (130) and a second retaining projection (140), wherein the first retaining projection extends in an extension plane (117) of the terminating wall from the first edge in a first projection direction (131) along a first center axis (132) of the first retaining projection and the second retaining projection extends in the extension plane (117) of the terminating wall from the second edge in a second projection direction (141) along a second center axis (142) of the second retaining projection.

12 Claims, 4 Drawing Sheets

(51) Int. Cl.
 *H02K 3/32* (2006.01)
 *H02K 3/52* (2006.01)
(58) Field of Classification Search
 USPC .................................... 310/214, 215, 194
 See application file for complete search history.

(56) References Cited

U.S. PATENT DOCUMENTS

| 2007/0096583 | A1* | 5/2007 | Welke | H02K 3/325 |
| | | | | 310/214 |
| 2010/0079028 | A1* | 4/2010 | Turner | H02K 3/487 |
| | | | | 310/214 |
| 2010/0156200 | A1* | 6/2010 | Busch | H02K 3/522 |
| | | | | 310/12.21 |

FOREIGN PATENT DOCUMENTS

| DE | 202010014425 | 1/2011 |
| DE | 102010042677 | 2/2012 |
| JP | 60144135 | 7/1985 |
| JP | 2003235192 A | 8/2003 |
| JP | 2006320136 A | 11/2006 |
| JP | 2011130566 | 6/2011 |

* cited by examiner

COIL FORMER HAVING INTEGRATED RETAINERS FOR A PHASE ISOLATION PAPER

BACKGROUND OF THE INVENTION

The invention relates to coils for electric machines or electric power tools. In particular, the invention relates to a coil former for a coil of an electric machine, a stator for an electric machine and also an electric machine having a stator of this type.

Electric machines and for example electric motors comprise a stator and a rotor, wherein conventionally at least the stator comprises a plurality of coils that under the influence of electric energy generate a magnetic field that sets the rotor in rotations. In order to provide mutual electrical insulation of the coils from one another, it is possible by way of example to place an insulation paper or any other phase insulating element between the coils in order to prevent by way of example any insulating damage to the coil wire of the coils producing an undesired electrical contact between adjacent coils.

DE 10 2010 042 677 A1 illustrates a stator of this type for an electric machine having a corresponding coil arrangement.

DE 20 2010 014 425 U1 illustrates a stator for an electric motor, wherein the stator comprises an insulating element that is embodied so as to insulate the phase potential rails of the stator.

In order to mechanically fix or rather electrically insulate the individual components, it is possible to impregnate both coils and phase insulating element, in other words to spray them with a resin or to submerge then in a resin.

SUMMARY OF THE INVENTION

The invention renders it possible to improve the construction of a coil former, which can reduce the number of rejects of individual coil formers and also complete stators.

During the course of manufacturing stators for electric machines, it is possible for a phase insulation element or phase insulation paper to be displaced out of position, said insulating element or phase insulation paper being located between two coils or rather phases of the stator in order to electrically insulate said parts from one another. Once the stator has been impregnated, this displaced phase insulation element is however fixed in its displaced position and can no longer be moved or rather repositioned. Consequently, it is possible during an operation of an electric machine that a rotor comes into contact with the displaced phased insulation element, as a consequence of which by way of example undesired operating noises or operating malfunctions can occur. The phase insulation element that has been fixed in an incorrect position can lead to the corresponding stator no longer being suitable for further use, in other words represents a reject.

The invention proposes a coil former for a coil of an electric machine, a stator for an electric machine and also an electric machine.

One aspect of the invention proposes a coil former for a coil of an electric machine, wherein the coil former comprises a coil form and a terminating wall having a first edge and a second edge. The first edge is arranged lying opposite the second edge and the terminating wall is embodied so as to hold in a wound position a coil wire that is wound around the coil core. The coil former is characterized in that the terminating wall comprises a first holding protrusion and a second holding protrusion, wherein the first holding protrusion extends in an extension plane of the terminating wall from the first edge in a first protrusion direction along a first center axis of the first holding protrusion and wherein the second holding protrusion extends in the extension plane of the terminating wall from the second edge in a second protrusion direction along a second center axis of the second holding protrusion.

The terminating wall can by way of example be arranged or embodied in a plane in an orthogonal manner with respect to a longitudinal axis of the coil core so that the coil wire that is wound about the coil core is held in this wound position and cannot slip off the coil core in the longitudinal direction of said coil core.

The terminating wall can by way of example be a synthetic material part or a synthetic material molded part or any other planar element embodied from an electrically non-conductive material. Consequently, the coil core together with the terminating wall forms an approximately T-shaped cross-section, wherein the terminating wall represents the horizontally extending part of the cross-section and protrudes laterally at least in two directions beyond the coil core.

The first holding protrusion can extend in one plane of the terminating wall and in a perpendicular manner from a first edge of the terminating wall; however, it can also include an angle other than 90 degrees with the first edge of the terminating wall, so that the first holding protrusion extends in an inclined or transverse manner with respect to the first edge of the terminating wall. These embodiments also apply accordingly for the second holding protrusion and the second edge of the terminating wall.

The first holding protrusion and the second holding protrusion can be embodied in particular so as to fix in a predefined or desired position a phase insulating element that is embodied for the purpose of electrically insulating one coil from another coil, so that the relevant phase insulation element cannot be displaced during a process of manufacturing or assembling a coil or the stator.

In accordance with one embodiment, the first center axis comprises an offset spacing with respect to the second center axis.

This renders it possible to arrange structurally identical coil formers as close to one another on a stator that in each case the first edge of a coil former is next to the second edge of an adjacent coil former or rather conversely, wherein the first holding protrusion at the first edge is offset with respect to the second holding protrusion at the second edge so that the holding protrusions of adjacent coil formers do not come into contact with one another.

In accordance with a further embodiment, the offset spacing is greater than a total of half a first width of the first holding protrusion and half a second width of the second holding protrusion.

The minimum offset spacing that has been fixed in this manner between the first center axis and the second center axis renders it possible by way of example to take into consideration that the first width of the first holding protrusion differs from the second width of the second holding protrusion. This naturally applies for the case that each center axis extends centrally through the first holding protrusion or rather the second holding protrusion, in other words that it applies for each holding protrusion that the center axis extends through the respective holding protrusion in the case of half the width.

In accordance with a further embodiment, at least two holding protrusions are arranged on the first edge and at least two holding protrusions are arranged on the second edge, wherein a projection of the holding protrusions at the first edge towards the center axis of the terminating wall do not overlap with a projection of the holding protrusions at the second edge towards the center axis of the terminating wall.

In other words, this means that, in the case of adjacent coil formers in which the second edge and the first edge lie opposite one another and accordingly conversely, the holding protrusions that are arranged in each case at these edges do not come into contact with one another since their projection towards the center axis of the terminating wall does not overlap, which means that all holding protrusions comprise a corresponding offset spacing with respect to one another as mentioned above.

In accordance with a further embodiment, the holding protrusions and the terminating wall are embodied in one piece.

This can in particular simplify a process of manufacturing the coil former or at least the terminating wall. Furthermore, this can lead to an increased mechanical resistance of the holding protrusions since the holding protrusions are not connected by way of additional fastening elements to the terminating wall but rather are embodied precisely in one piece in this embodiment.

A further aspect of the invention proposes a stator for an electric machine, wherein the stator comprises a first coil former as described above and hereinunder and a second coil former as described above and hereinunder. The first coil former and the second coil former are arranged along a circumferential direction of the stator in such a manner that a center axis of the terminating wall of the first coil former and of the second coil former extend in parallel to a center axis of the stator. The stator is characterized in that the first holding protrusion of the first terminating wall and the second holding protrusion of the second terminating wall of the second coil former protrude into an intermediate space between the first terminating wall and the second terminating wall, wherein a width of the intermediate space is less than a total of the first length of the first holding protrusion and the second length of the second holding protrusion, so that the first holding protrusion and the second holding protrusion overlap at least in part in a direction along their center axis.

If, by way of example, the first edge of the first terminating wall and the second edge of the second terminating wall lie opposite adjacent coil formers, then this means that the holding protrusions of the first edge protrude in the direction of the second edge of the terminating wall of the adjacent coil former and accordingly conversely. By virtue of offsetting the holding protrusions at the first edge and the holding protrusions at the second edge with respect to one another, the holding protrusions do not make contact but rather extend in an overlapping section in the extension plane of the terminating walls adjacent to one another.

Reference is made to the fact that adjacent coils are also arranged in such a manner that the extension planes of the respective terminating walls do not coincide and also do not extend in a parallel manner with respect to one another but rather intersect one another. It is possible in such a case for the holding protrusions of the respective coil formers to extend in a transverse manner with respect to one another since they can in each case follow the progression of the corresponding extension plane of the terminating wall.

By virtue of this arrangement, the holding protrusions that overlap in an intermediate space can fasten a phase insulation element in the intermediate space and in fact so that the phase insulation element does not protrude beyond the extension plane of the terminating wall.

In accordance with one embodiment, the stator comprises furthermore a phase insulating element for the purpose of electrically insulating the coil wire on the first coil former from the coil wire on the second coil former, wherein the phase insulating element is arranged in the intermediate space and wherein the first holding protrusion and the second holding protrusion are embodied so as to hold the phase insulating element in the intermediate space to prevent movement in the direction transverse to the extension plane of the first terminating wall and the second terminating wall.

As already illustrated, the coil former comprises a T-shaped cross-section, wherein the vertically extending element of the T-shaped cross-section corresponds to the coil core and the horizontally extending element of the T-shaped cross-section corresponds to the terminating wall. The coil wire is wound about the coil core and is prevented by the terminating wall from departing from this position. The phase insulating element, by way of example in the form of a phase insulating paper, is arranged between two adjacent coil formers in such a manner that in each case the coil wires or rather coil windings about the coil core are electrically insulated from one another. The phase insulating element is to be prevented in particular from moving in the direction of the terminating wall or from protruding beyond said terminating wall, since in this event the coil windings of adjacent coil formers can make contact and any damaged insulation of the coil wire can cause a malfunction of the stator.

A further aspect of the invention proposes an electric machine having a stator as described above and hereinunder.

Exemplary embodiments of the invention are described hereinunder with reference to the figures.

Figure 1:
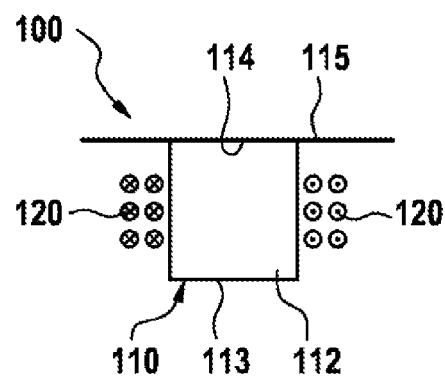
FIG. 1 illustrates a schematic cross-sectional view of a coil having a coil former in accordance with an exemplary embodiment of the invention.

The illustrations in the figures are schematic and not true to scale.

Like reference numerals are used in the following description of the figures and refer to like or similar elements.

DETAILED DESCRIPTION

FIG. 1 illustrates a coil 100 having a coil former 110. The coil former 110 comprises a coil core 112 and a terminating wall 115, wherein the terminating wall 115 extends in an orthogonal manner with respect to the coil core 112. The coil core 112 has a first surface 113 and a second surface 114, wherein the first surface 113 is embodied so as to fasten the coil core to a stator and wherein the terminating wall 115 is arranged on the second surface 114. It is evident in the illustration that the first surface 113 is opposite the second surface 114. A coil wire 120 is wound a number of times about the coil core 112.

Figure 2:
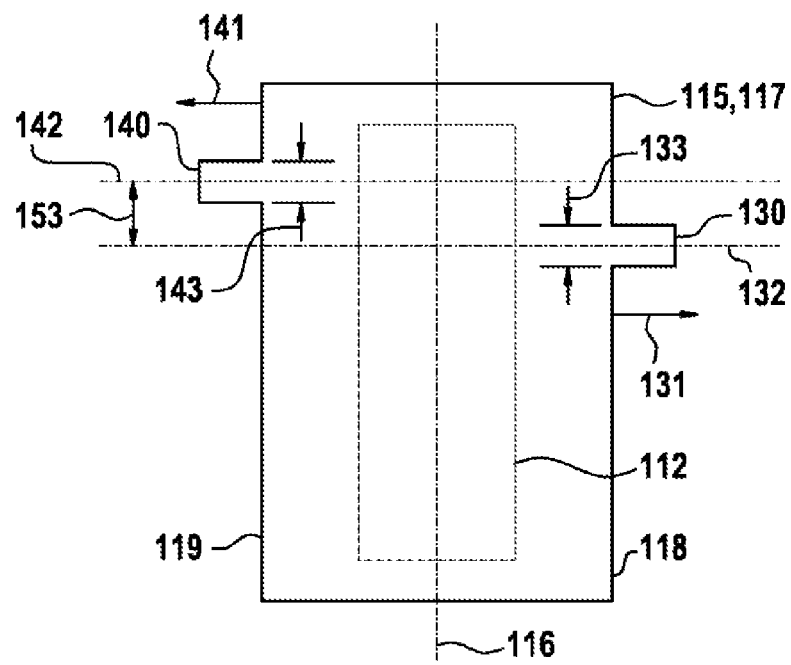
FIG. 2 illustrates a schematic plan view of a coil former in accordance with an exemplary embodiment of the invention.

FIG. 2 illustrates a terminating wall 115 that spans an extension plane 117. The coil core 112 is indicated by a broken line in a non-visible region that lies behind the terminating wall 115. In an alternative embodiment, the terminating wall can comprise a through-going opening in which the coil core is arranged and as a consequence the terminating wall in this alternative embodiment does not form a continuous planar element. The terminating wall 115 comprises a first edge 118 and a second edge 119, wherein the first edge and the second edge lie opposite one another. The first holding protrusion 130 is arranged on the first edge and the second holding protrusion 140 is arranged on the second edge 119.

The first holding protrusion 130 protrudes in a protrusion direction 131 from the first edge 118, wherein the first holding protrusion 130 extends along the center axis 132 of the first holding protrusion. The first holding protrusion 130 comprises a width 133. The second holding protrusion 140 extends from the terminating wall from the second edge 119 in a protrusion direction 141 of the second holding protrusion along the center axis 142 of the second holding protrusion and comprises a width 143. The center axis 132 and the center axis 142 are offset with respect to one another at an offset spacing 153 along the center axis 116 of the terminating wall. In FIG. 2, the center axes 132, 142 extend in parallel to one another and in each case perpendicular to the first edge or to the second edge respectively. The first edge and the second edge lie opposite one another at the terminating wall and likewise extend parallel to one another.

Figure 3:
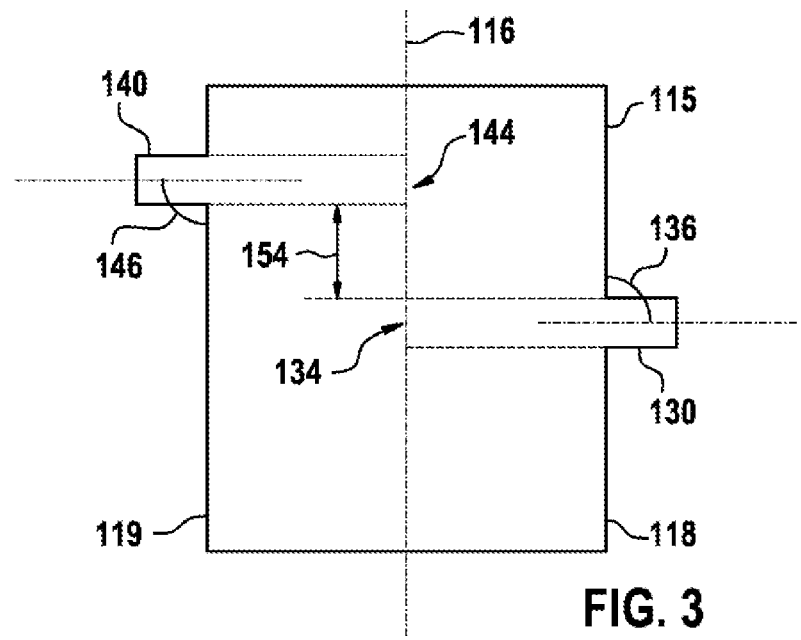
FIG. 3 illustrates a schematic illustration of a terminating wall of a coil former in accordance with an exemplary embodiment of the invention.

FIG. 3 illustrates a terminating wall 115 having a first holding protrusion 130 and a second holding protrusion 140. The first holding protrusion 130 and accordingly the second holding protrusion 140 include a first angle of inclination 136 or a second angle of inclination 146 respectively with respect to the first edge and the second edge respectively. The angle of inclination 136, 146 can be 90 degrees or a value differing therefrom. By way of example, each of the angles of inclination in an alternative embodiment can be less than 90 degrees, in particular 75 degrees or 60 degrees.

Furthermore, FIG. 3 illustrates the projections of the first holding protrusion 130 and accordingly the second holding protrusion 140 towards the center axis 116 of the terminating wall 115. The perpendicular projection of the first holding protrusion 130 is illustrated away from the first position region 134 and the perpendicular projection of the second holding protrusion 140 towards the center axis 116 away from the projection region 144. The offset spacing 154 of the projection regions 134, 144 illustrates that the first holding protrusion 130 and the second holding protrusion 140 are offset with respect to one another in such a manner that the holding protrusions of coil formers that are constructed in a similar manner and are arranged adjacent to one another do not overlap, wherein the first edge of the terminating wall and the second edge of the adjacent terminating wall lie opposite one another, but rather said coil formers extend in part in dependence upon the length of the holding protrusions adjacent to one another or in a transverse manner with respect to one another.

Figure 4:
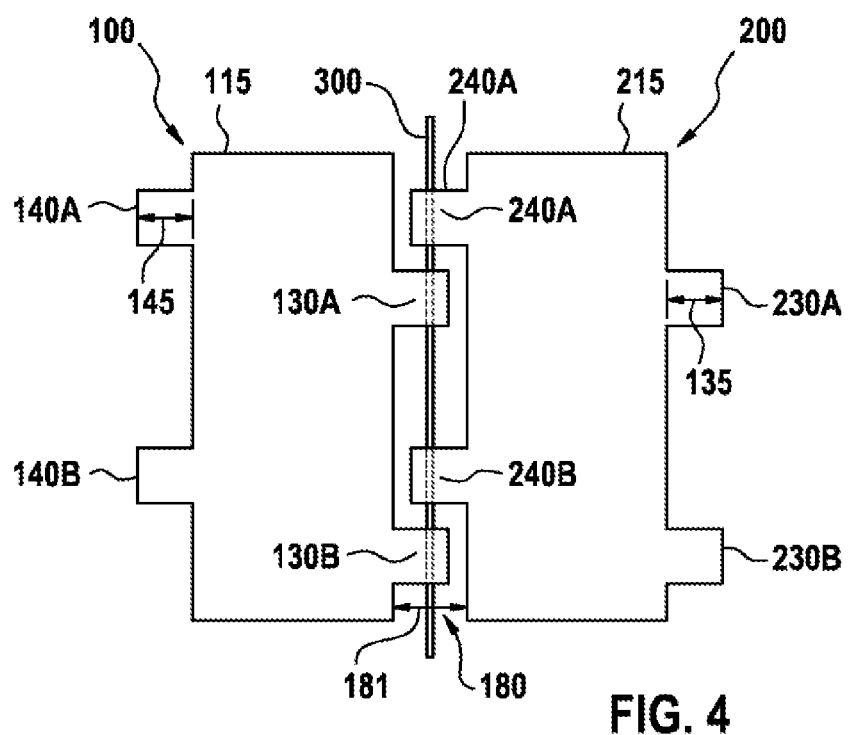
FIG. 4 illustrates a schematic view of two adjacent coil formers in accordance with an exemplary embodiment of the invention.

FIG. 4 illustrates two adjacent lying coils 100, 200. The first coil 100 comprises at the first edge two holding protrusions 130A, 130B and at the second edge two holding protrusions 140A, 140B. The holding protrusions 130A, 130B comprise a length 135 and the holding protrusions 140A, 140B comprise a length 145, wherein these lengths represent the extent to which the holding protrusions protrude from the edge of the terminating wall.

The terminating wall 215 of the second coil 200 is constructed in a similar manner to the terminating wall 115 of the first coil 100. It follows from this that the descriptions relating to the first coil 100 apply accordingly for the second coil 200.

Reference is made to the fact that both the length 135 can differ from the length 145 and also the holding protrusions at the same edge can comprise different lengths.

The adjacent coils 100, 200 form between one another an intermediate space 180 comprising a width 181. A phase insulation element 300 is illustrated in the intermediate space 180. By virtue of the overlapping arrangement of the holding protrusions 130A, 240A and respectively 130B, 240B, that in each case represent a holding protrusion pair, it is not possible for the phase insulation element 300 to move out of the intermediate space 180 in a direction transverse or orthogonal with respect to the extension plane of the terminating wall 115, 215. The holding protrusion 130A of the terminating wall 115 protrudes in the direction of the terminating wall 215 and the holding protrusion 240A of the terminating wall 215 protrudes in the opposite direction to the terminating wall 115, wherein these two holding protrusions overlap and in part extend adjacent to one another since they are offset in a transverse manner with respect to one another as illustrated above and the total of their lengths 135, 145 is greater than the width 181 of the intermediate space 180.

Figure 5:
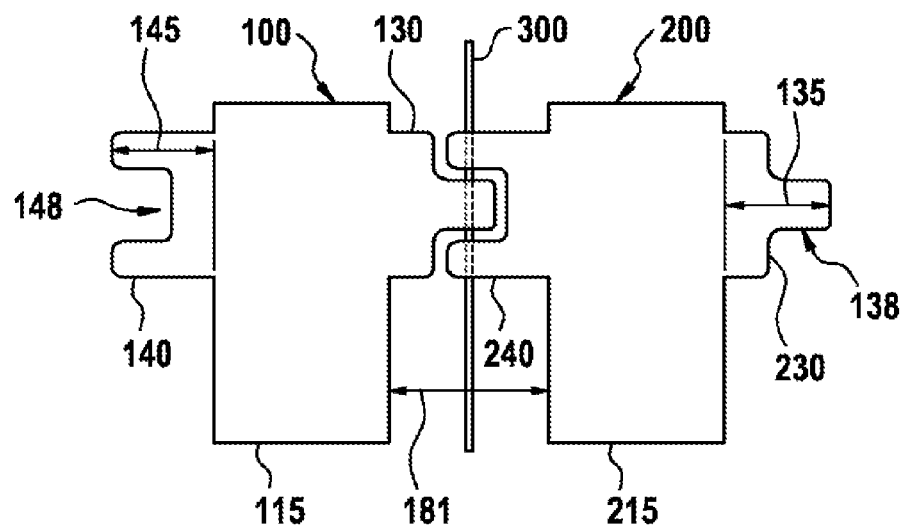
FIG. 5 illustrates a schematic view of two adjacent coil formers in accordance with an exemplary embodiment of the invention.

FIG. 5 illustrates an exemplary embodiment in which the holding protrusions do not have an offset spacing with respect to one another but rather overlap in the intermediate space 180 between the coils 100, 200. The first holding protrusion 130 comprises a tongue 138 that likewise extends in the direction in which the first holding protrusion protrudes and the second holding protrusion 140 comprises a recess or rather notch 148, wherein the notch extends in the opposite direction of the protrusion direction of the second holding protrusion 140. In other words, the notch 148 represents a complementary element to the tongue 138 and the tongue 138 protrudes into the notch 148 if two coils 100, 200 are arranged adjacent to one another. By virtue of this contactless, zipper-like manner in which the tongue 138 of the first holding protrusion 130 protrudes into the notch 148 of the second holding protrusion 140, it is likewise prevented that a phase insulation element 300, which is located in the intermediate space 180, moves in a direction transverse to the extension plane of the terminating wall of a coil former.

Figure 6:
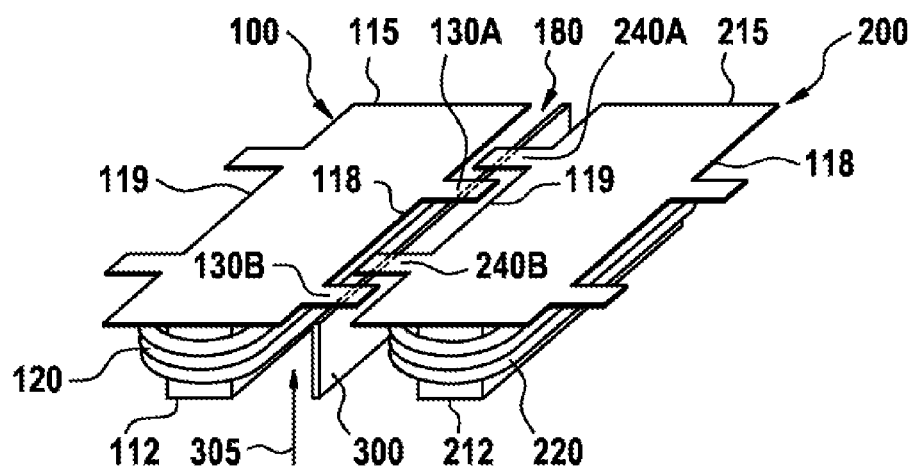
FIG. 6 illustrates a schematic isometric view of two adjacent coil formers in accordance with an exemplary embodiment of the invention.

FIG. 6 illustrates an isometric view of two adjacent coils 100, 200. The coils 100, 200 comprise in each case a coil former having a coil core 112, 212 and a terminating wall 115, 215, wherein a coil wire 120, 220 is wound about each coil core 112, 212.

The phase insulation element 300 is arranged and embodied in the intermediate space 180 between the coils 100, 200 in order to electrically insulate the coil wires 120, 200 from one another. It is evident in the illustration that the first edge 118 of the terminating wall 115 of the first coil 100 is adjacent to the second edge 119 of the terminating wall 215 of the second coil 200, in other words these edges lie opposite one another and form the intermediate space 180 between the first coil 100 and the second coil 200.

During the course of arranging the coils 100, 200 at a stator (not illustrated) it is possible that the phase insulation element 300 moves by way of example in a direction 305 transverse to the terminating wall 115, 215 and as a result the electrical insulation of the coil wires 120, 220 with respect to one another is no longer complete. The phase insulation element 300 can naturally also displace during other steps of manufacturing or assembling a stator or an electric machine. It is precisely this displacement of the phase insulation element 300 along the direction 305, in other words out of the intermediate space 180, that is avoided by virtue of the holding protrusions 130A, 240A and 130B, 240B of the first terminating wall 115 and the second terminating wall 215 overlapping in the intermediate space 180.

Figure 7:
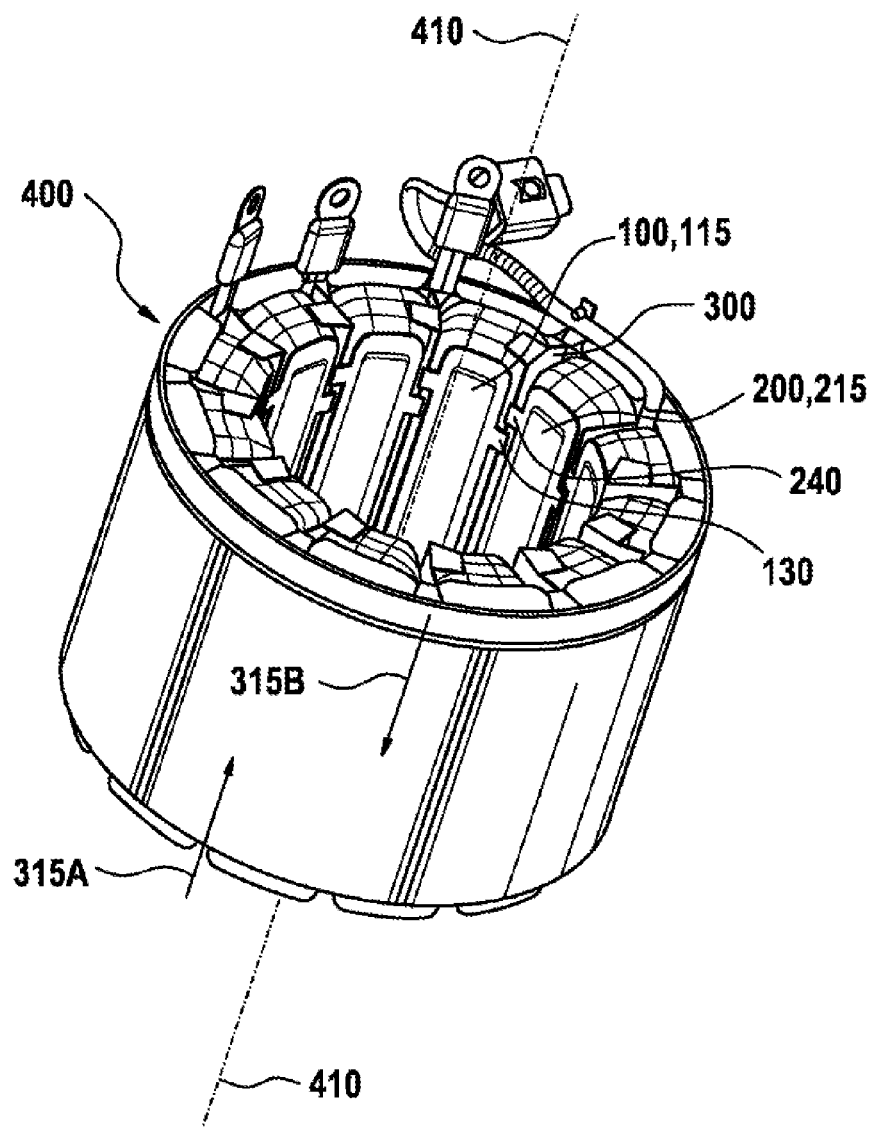
FIG. 7 illustrates an isometric view of a stator in accordance with an exemplary embodiment of the invention.

FIG. 7 illustrates a stator 400 for an electric machine, wherein the stator is embodied in a circular manner and a plurality of coils are arranged along the circumferential direction of the stator 400 in such a manner that in each case the center axis of a terminating wall of a coil extends parallel to the center axis 410 of the stator. The terminating walls 115, 215 of the coils 100, 200 point in a radial direction of the stator towards the center 410 of the stator.

Each terminating wall 115, 215 of the coils 100, 200 can be constructed in a similar manner and comprise holding protrusions 130, 240 that are offset with respect to one another, wherein it is precisely the holding protrusions 130, 240 that overlap in an intermediate space that ensure that a phase insulation element that is located in the intermediate space cannot move in the radial direction of the stator towards the center axis 410 of the stator. In the event that the phase insulation element 300 would move in the radial direction towards the center axis 410 of the stator, it is possible that as a rotor that is rotatably mounted in the stator rotates, said rotor could grind or impact against the protruding phase insulation element in such a manner that noises can occur and/or the functioning of the stator and accordingly of the entire electric machine can be impaired. It is precisely this that the invention avoids.

The phase insulation elements 300 can still be placed in the intermediate space in a simple manner, in which the phase insulation element is inserted into the intermediate space in a longitudinal direction of the stator along the assembly direction arrows 315A, 315B parallel to the center axis 410.

What is claimed is:

1. A coil former (110) for a coil (100) of an electric machine (400), said coil former comprising:
a coil core (112); and
a terminating wall (115) having a first edge (118) and a second edge (119);
wherein the first edge is arranged opposite the second edge;
wherein the terminating wall is configured to hold a coil wire (120) in a wound position wound about the coil core;
characterized in that:
the terminating wall comprises a first holding protrusion (130) and a second holding protrusion (140);
wherein the first holding protrusion extends in an extension plane (117) of the terminating wall from the first edge in a first protrusion direction (131) along a first center axis (132) of the first holding protrusion;
wherein the second holding protrusion extends in the extension plane (117) of the terminating wall from the second edge in a second protrusion direction (141) along a second center axis (142) of the second holding protrusion;
wherein at least two first holding protrusions (130A, 130B) are arranged at the first edge;
wherein at least two second holding protrusions (140A, 140B) are arranged at the second edge; and
wherein a projection (134) of the first holding protrusions at the first edge towards a center axis (116) of the terminating wall does not overlap with a projection (144) of the second holding protrusions at the second edge towards the center axis of the terminating wall.

2. The coil former as claimed in claim 1, wherein the first center axis comprises an offset spacing (153) with respect to the second center axis.

3. The coil former as claimed in claim 2, wherein the offset spacing is greater than a total of half of a first width (133) of the first holding protrusion and half of a second width (143) of the second holding protrusion.

4. The coil former as claimed in claim 1, wherein the first and second holding protrusions (130, 130A, 130B, 140, 140A, 140B) and the terminating wall are embodied in one piece.

5. A stator (400) for an electric machine, the stator comprising a first coil former and a second coil former both as claimed in claim 1;
wherein the first coil former and the second coil former are arranged along a circumferential direction of the stator in such a manner that a center axis of the terminating wall of the first coil former and a center axis of the terminating wall of the second coil former extend parallel to a center axis (410) of the stator, characterized in that:
the first holding protrusion (130) of the terminating wall (115) of the first coil former and the second holding protrusion (240) of the terminating wall (215) of the second coil former protrude into an intermediate space (180) between the terminating wall of the first coil former and the terminating wall of the second coil former;
wherein a width (181) of the intermediate space (180) is less than a total of a length (135) of the first holding protrusion and a length (145) of the second holding protrusion, so that the first holding protrusion and the second holding protrusion at least in part overlap in a direction along the first center axis and the second center axis (132, 142).

6. The stator as claimed in claim 5,
further comprising a phase insulating element (300) for electrically insulating the coil wire on the first coil former from the coil wire on the second coil former;
wherein the phase insulation element is arranged in the intermediate space (180);
wherein the first holding protrusion and the second holding protrusion are configured to fix the phase insulation element in the intermediate space to prevent movement in a direction (305) transverse to the extension plane (117) of the first terminating wall and the second terminating wall.

7. An electric machine having a stator as claimed in claim 5.

8. An electric machine comprising:
a rotor; and
a stator (400) including a first coil former (110), a second coil former (210), and a phase insulating element (300),
wherein each of the first coil former and the second coil former includes
a coil core (112, 212), and
a terminating wall (115, 215) having a first edge (118) and a second edge (119),
wherein the first edge is arranged opposite the second edge, wherein the terminating wall is facing the rotor, wherein the terminating wall is configured to hold a coil wire (120, 220) in a wound position wound about the coil core, wherein the terminating wall includes a first holding protrusion (130, 230) and a second holding protrusion (140, 240), wherein the first holding protrusion extends in an extension plane (117) of the terminating wall from the first edge, and wherein the second holding protrusion extends in the extension plane (117) of the terminating wall from the second edge, wherein the phase insulating element (300) is for electrically insulating the coil wire on the first coil former from the coil wire on the second coil former, wherein the phase insulating element (300) is arranged between the first coil former (110) and the second coil former (210), wherein the first holding protrusion (130) of the terminating wall (115) of the first coil former and the second holding protrusion (240) of the terminating wall (215) of the second coil former protrude into an intermediate space (180) between the terminating wall of the first coil former and the terminating wall of the second coil former, wherein a width (181) of the intermediate space (180) is less than a total of a length (135) of the first holding protrusion (130) and a length (145) of the second holding protrusion (240), so that the first holding protrusion (130) and the second holding protrusion (240) at least in part overlap in an axial direction of the stator with respect to a projection of the holding protrusions, and wherein the first holding protrusion (130) and the second holding protrusion (240) are configured to fix the phase insulation element in the intermediate space to prevent movement in a direction (305) transverse to the extension plane (117) of the first terminating wall and the second terminating wall.

9. The electric machine as claimed in claim 8, wherein the first coil former has a first center axis (132), wherein the second coil former has a second center axis (142), and wherein the first center axis comprises an offset spacing (153) with respect to the second center axis.

10. The electric machine as claimed in claim 9, wherein the offset spacing is greater than a total of half of a first width (133) of the first holding protrusion and half of a second width (143) of the second holding protrusion.

11. The electric machine as claimed in claim 8, wherein at least two first holding protrusions (130A, 130B) are arranged at the first edge;

wherein at least two second holding protrusions (140A, 140B) are arranged at the second edge;

wherein a projection (134) of the first holding protrusions at the first edge towards a center axis (116) of the terminating wall does not overlap with a projection (144) of the second holding protrusions at the second edge towards the center axis of the terminating wall.

12. The electric machine as claimed in claim 8, wherein the first and second holding protrusions (130, 130A, 130B, 140, 140A, 140B) and the terminating wall are embodied in one piece.

* * * * *